US012780289B2

(12) United States Patent
Son

(10) Patent No.: US 12,780,289 B2
(45) Date of Patent: Nov. 3, 2026

(54) STEERING APPARATUS FOR VEHICLE

(71) Applicant: HYUNDAI MOBIS CO., LTD., Seoul (KR)

(72) Inventor: Chang Wook Son, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 300 days.

(21) Appl. No.: 18/626,731

(22) Filed: Apr. 4, 2024

(65) Prior Publication Data

US 2025/0091637 A1 Mar. 20, 2025

(30) Foreign Application Priority Data

Sep. 19, 2023 (KR) ........................ 10-2023-0124609

(51) Int. Cl.
*B62D 5/00* (2006.01)

(52) U.S. Cl.
CPC .................................... *B62D 5/001* (2013.01)

(58) Field of Classification Search
CPC . B62D 1/16; B62D 1/166; B62D 1/18; B62D 1/184; B62D 1/19; B62D 1/197; B62D 1/20; B62D 5/001; B62D 5/003; B62D 5/005; B62D 5/006; B62D 5/0409; B62D 5/0412; B62D 5/0415; B60Y 2400/83; F16H 2035/006
USPC .......................................................... 180/444
See application file for complete search history.

(56) References Cited

U.S. PATENT DOCUMENTS

| | | | | |
|---|---|---|---|---|
| 8,775,028 | B2 * | 7/2014 | Tashiro | B62D 5/003 180/404 |
| 10,676,126 | B2 * | 6/2020 | Bodtker | B62D 1/16 |
| 2016/0146262 | A1 * | 5/2016 | Kogure | F16D 3/68 180/444 |
| 2020/0130725 | A1 | 4/2020 | Ishimura et al. | |
| 2022/0396304 | A1 | 12/2022 | Buker | |

(Continued)

FOREIGN PATENT DOCUMENTS

| | | | | |
|---|---|---|---|---|
| CN | 116639179 A | * | 8/2023 | B62D 5/006 |
| CN | 119428827 A | * | 2/2025 | B62D 5/001 |
| DE | 102019111992 A1 | | 11/2020 | |

(Continued)

OTHER PUBLICATIONS

Extended European Search Report issued on Oct. 21, 2024 in the corresponding European Patent Application No. 24169895.0.

*Primary Examiner* — Joshua E Rodden
(74) *Attorney, Agent, or Firm* — Morgan, Lewis & Bockius LLP

(57) ABSTRACT

A steering apparatus according to the present disclosure include a housing having a housing body part, and a housing protrusion part that protrudes from an inner side surface of the housing body part, a rotation shaft part rotatably mounted on the housing, a first rotation part mounted on the rotation shaft part and rotated according to a rotation of the rotation shaft part, a second rotation part rotatably mounted on the rotation shaft part and rotated upon contact with the first rotation part, a third rotation part rotatably mounted on the rotation shaft part, rotated upon contact with the second rotation part, and restricted in its rotation when coming into contact with the housing protrusion part, and a bolt part mounted on the end portion of the rotation shaft part and configured to support the third rotation part.

10 Claims, 10 Drawing Sheets

(56) References Cited

U.S. PATENT DOCUMENTS

| | | | | |
|---|---|---|---|---|
| 2025/0222974 | A1 * | 7/2025 | Kim | B62D 5/005 |

FOREIGN PATENT DOCUMENTS

| | | | | | |
|---|---|---|---|---|---|
| JP | 2000-272526 | A | | 10/2000 | |
| KR | 10-2020-0047871 | A | | 5/2020 | |
| KR | 2024159304 | A | * | 11/2024 | |
| KR | 2024177107 | A | * | 12/2024 | |
| WO | WO-2024034432 | A1 | * | 2/2024 | B62D 5/001 |

* cited by examiner

STEERING APPARATUS FOR VEHICLE

CROSS-REFERENCE TO RELATED APPLICATION

This application claims priority from and the benefit of Korean Patent Application No. 10-2023-0124609, filed on Sep. 19, 2023, which is hereby incorporated by reference for all purposes as if set forth herein.

BACKGROUND

Field

Exemplary embodiments of the present disclosure relate to a steering apparatus for a vehicle, and more specifically, to a steering apparatus for a vehicle, which can restrict a rotation of a rotation shaft part.

Discussion of the Background

A steer-by-wire (SBW) system is an electric signal type intelligent steering system that transmits and controls the driver's will to steer using electric signals without a mechanical linkage between a driver's steering wheel and vehicle wheels.

The SBW system comprises a steering feedback actuator (SFA) which is an actuator that provides reaction force of the steering wheel to the driver and a road wheel actuator (RWA) which an actuator that moves the vehicle wheels by transmitting the driver's steering intention to the wheels. The SFA and the RWA are connected only by wires without a mechanical linkage. Accordingly, the SBW system requires a structure for restricting its rotation direction. In a related art, a lead screw structure is used to restrict the number of revolutions.

The lead screw structure in a related art has a problem in that it is difficult to manage straightness according to a tolerance for injection molded plastic busing. In addition, there is a problem in that a friction dispersion occurs greatly due to a clearance between a plastic bushing and a nut, and in case of using a steel nut, an impact sound is generated. In addition, as an assembly for square-shaped bushing is needed, housing processing costs increase and additional processes are required.

Meanwhile, when evaluating friction at an extremely low temperature, in case of using a plastic material, it may cause a pinching phenomenon due to shrinkage and increase the friction. In addition, it needs to be set to have high strength due to the increase of stopping torque in steering. Therefore, there is a need to improve this.

The related art of the present disclosure is disclosed in Korean Patent Application Publication No. 10-2020-0047871 (published on May 8, 2020 and entitled "APPARATUS FOR LIMITED STEERING ANGLE IN STEER-BY-WIRE SYSTEM").

SUMMARY

Various embodiments are directed to providing a steering apparatus for a vehicle, which can restrict a rotation of a rotation shaft part.

A steering apparatus for a vehicle according to the present disclosure may include a housing having a housing body part, and a housing protrusion part that protrudes from an inner side surface of the housing body part, a rotation shaft part rotatably mounted on the housing, a first rotation part mounted on the rotation shaft part and rotated according to a rotation of the rotation shaft part, a second rotation part rotatably mounted on the rotation shaft part and rotated upon contact with the first rotation part, a third rotation part rotatably mounted on the rotation shaft part, rotated upon contact with the second rotation part, and restricted in its rotation when coming into contact with the housing protrusion part, and a bolt part mounted on an end portion of the rotation shaft part and configured to support the third rotation part.

In an embodiment, the first rotation part may include a first rotation body part having a first rotation hollow part that has a hollow shape, the first rotation body part is mounted on the rotation shaft part and rotated according to the rotation of the rotation shaft part and a first rotation protrusion part that protrudes from the first rotation body part toward a side of the second rotation part, and rotates the second rotation part upon contact with the second rotation part while being rotated according to a rotation of the first rotation body part.

In an embodiment, the second rotation part may include a second rotation body part having a second rotation hollow part that has a hollow shape and rotatably mounted on the rotation shaft part, a second rotating first-side protrusion part that protrudes from the second rotation body part toward a side of the first rotation part, and comes into contact with the first rotation part, and a second rotating second-side protrusion part that protrudes from the second rotation body part toward a side of the third rotation part, and comes into contact with the third rotation part.

In an embodiment, the second rotation part may further include a second rotation opposite part that protrudes from each of a first surface and a second surface of the second rotation body part, in which the second rotation hollow part is present, towards the side of the first rotation part and the side of the third rotation part, respectively.

In an embodiment, the second rotation part may further include an elastic part that is mounted on the second rotating first-side protrusion part or the second rotating second-side protrusion part, and configured to be elastically deformable when coming into contact with the first rotation part or the third rotation part.

In an embodiment, the elastic part has a shape of an annular shape and configured to wrap around the second rotating first-side protrusion part and the second rotating second-side protrusion part.

In an embodiment, the elastic part may include a first elastic part configured to wrap around the second rotation opposite part, and a second elastic part that is extended from the first elastic part and mounted to be in contact with an outer side surface of the second rotating first-side protrusion part or the second rotating second-side protrusion part.

In an embodiment, the third rotation part may include a third rotation body part having a third rotation hollow part that has a hollow shape and mounted on the rotation shaft part, a third rotation protrusion part that protrudes from the third rotation body part toward the second rotation part side, and comes into contact with the second rotation part, and a third rotation stopper part that protrudes from an outer side surface of the third rotation body part, rotates according to the rotation of the third rotation body part, and be restricted in its rotation when coming into contact with the housing protrusion part.

In an embodiment, the steering apparatus for a vehicle may further include a fourth rotation part that is disposed (i) between the rotation shaft part and the second rotation part, and (ii) between the rotation shaft part and the third rotation part to allow the second rotation part and the third rotation part to rotate separately with respect to the rotation shaft part.

In an embodiment, the steering apparatus for a vehicle may further include a tolerance part disposed between the rotation shaft part and the first rotation part.

According to the steering apparatus for a vehicle in accordance with the present disclosure, the steering apparatus for a vehicle has a structure in which the first rotation part, the second rotation part, and the third rotation part are configured to transmit rotational force while rotating in a rotational direction of the rotation part, so that there may be no clearance therebetween and the occurrence of friction distribution may be minimized.

Furthermore, according to the present disclosure, the elastic part is mounted on the second rotation part, and the second rotation part is disposed between the first rotation part and the third rotation part such that an NVH (Noise, Vibration, and Harshness) of the vehicle may be reduced by alleviating shock upon contact.

Furthermore, according to the present disclosure, it is possible to provide a steering apparatus for a vehicle that may be designed to have an optimal size.

DETAILED DESCRIPTION

Figure 1:
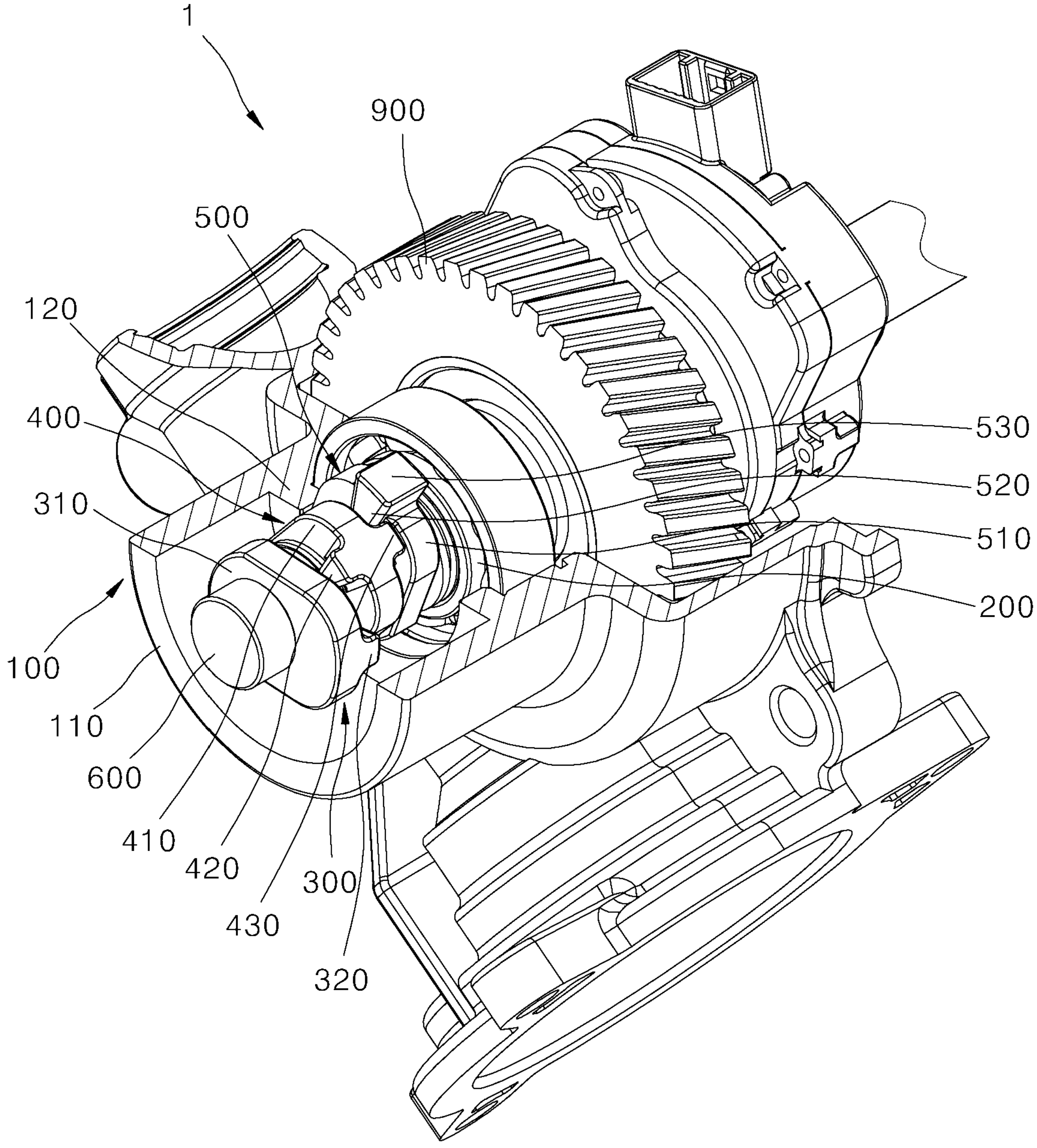
FIG. 1 is a partial cutaway perspective view schematically illustrating a steering apparatus for a vehicle according to an embodiment of the present disclosure.

Hereinafter, a steering apparatus for a vehicle according to embodiments of the present disclosure will be described with reference to the accompanying drawings. In this process, the thicknesses of lines or the sizes of components illustrated in the drawings may have been exaggerated for the clarity of a description and for convenience' sake.

Furthermore, terms to be described below have been defined by taking into consideration their functions in the present disclosure, and may be changed depending on a user or operator's intention or practice. Accordingly, such terms should be defined based on the overall contents of this specification.

Figure 2:
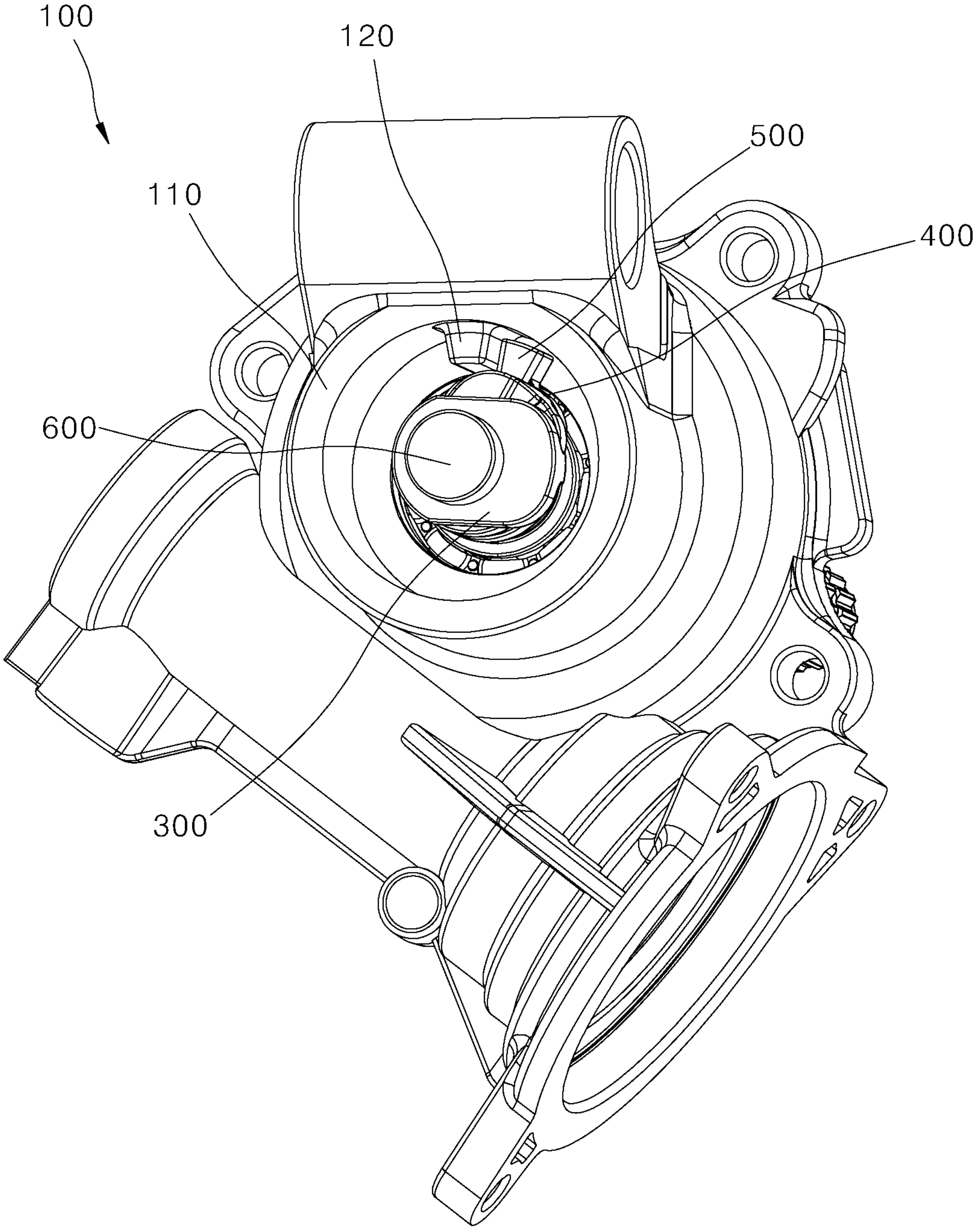
FIG. 2 is a perspective view schematically illustrating the steering apparatus for a vehicle according to an embodiment of the present disclosure.
Figure 3:
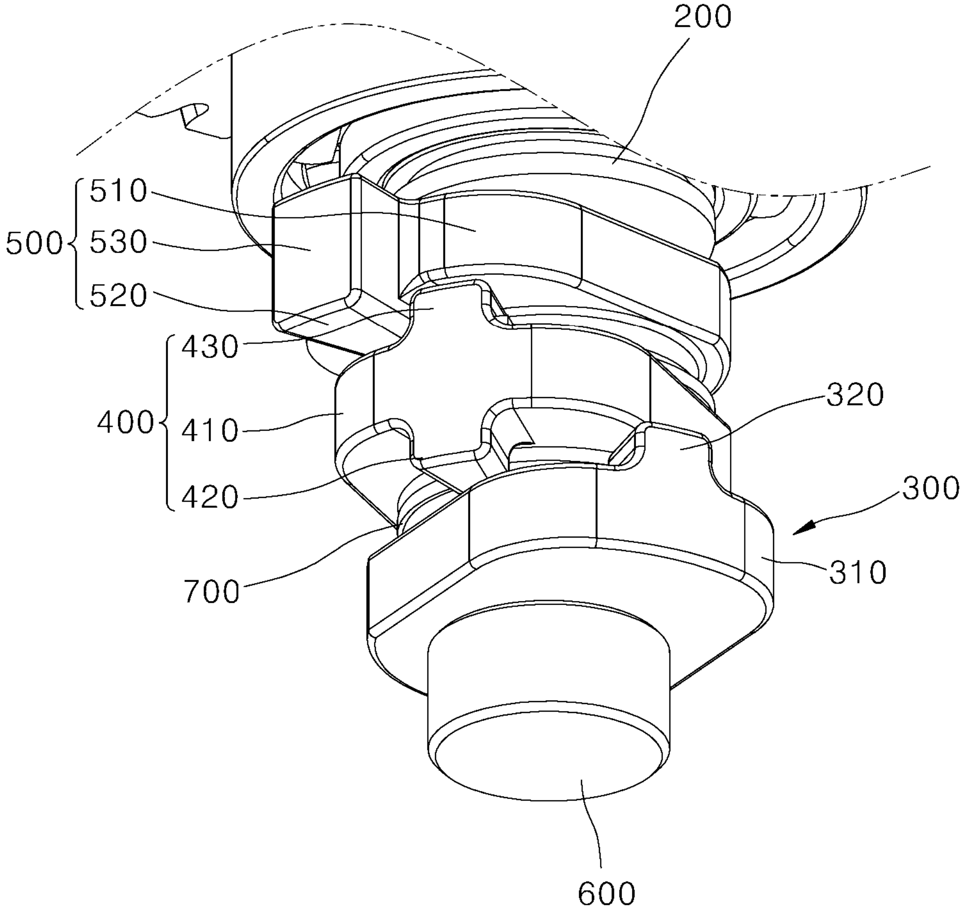
FIG. 3 is a perspective view schematically illustrating a main structure of the steering apparatus for a vehicle according to an embodiment of the present disclosure.
Figure 4:
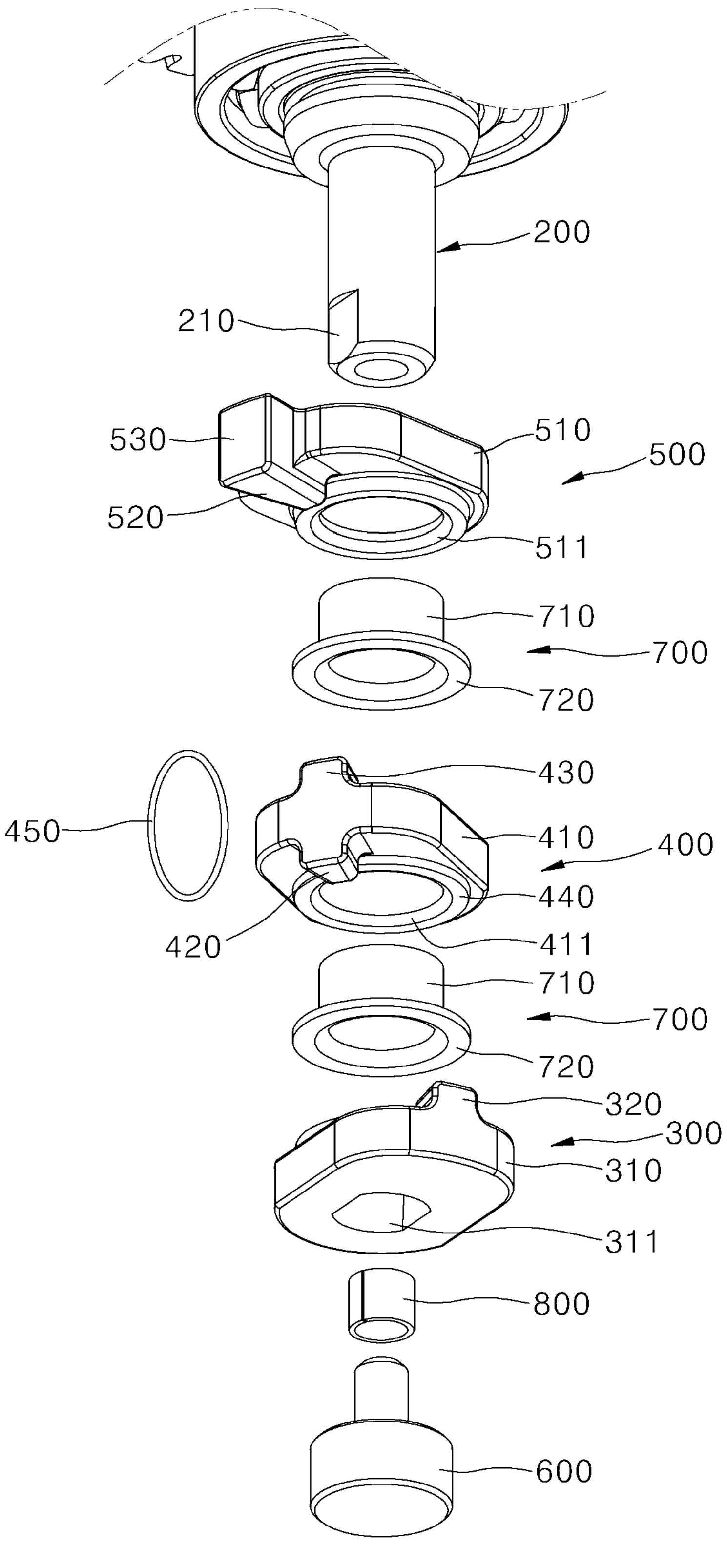
FIG. 4 is an assembled perspective view schematically illustrating a main structure of the steering apparatus for a vehicle according to an embodiment of the present disclosure.
Figure 5:
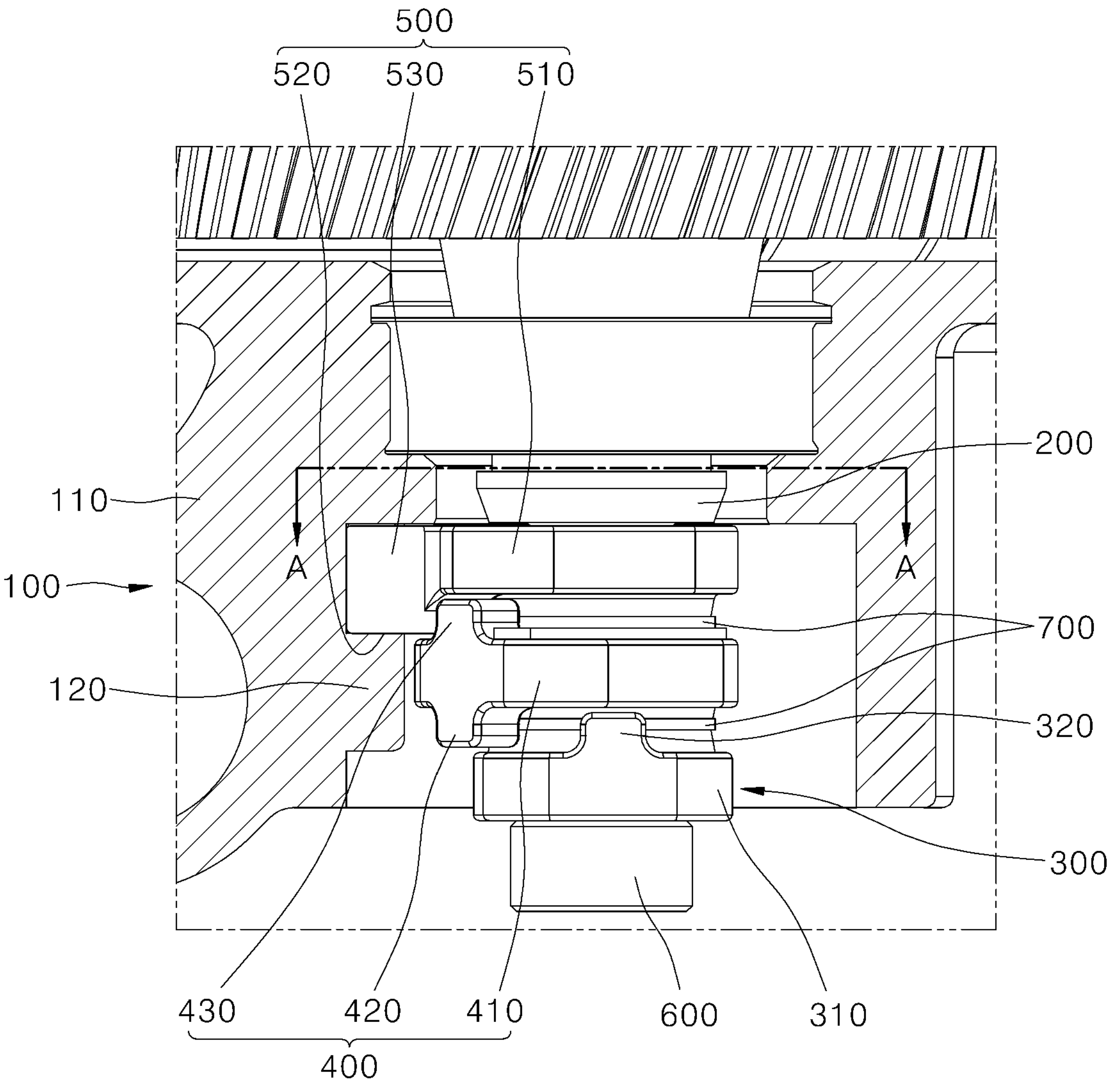
FIG. 5 is a partial cutaway view schematically illustrating the steering apparatus for a vehicle according to an embodiment of the present disclosure.
Figure 6:
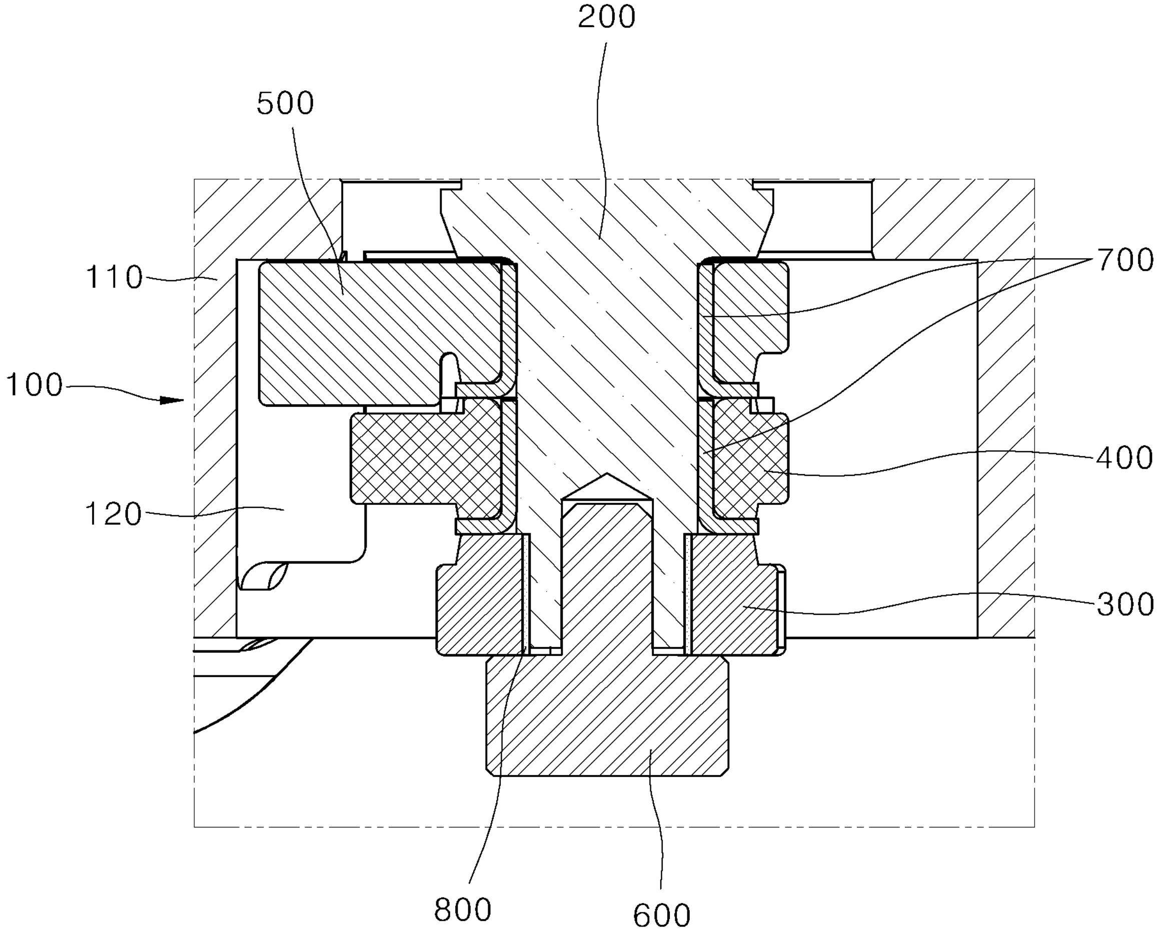
FIG. 6 is a cross-sectional view taken along a line A-A of FIG. 5.
Figure 7:
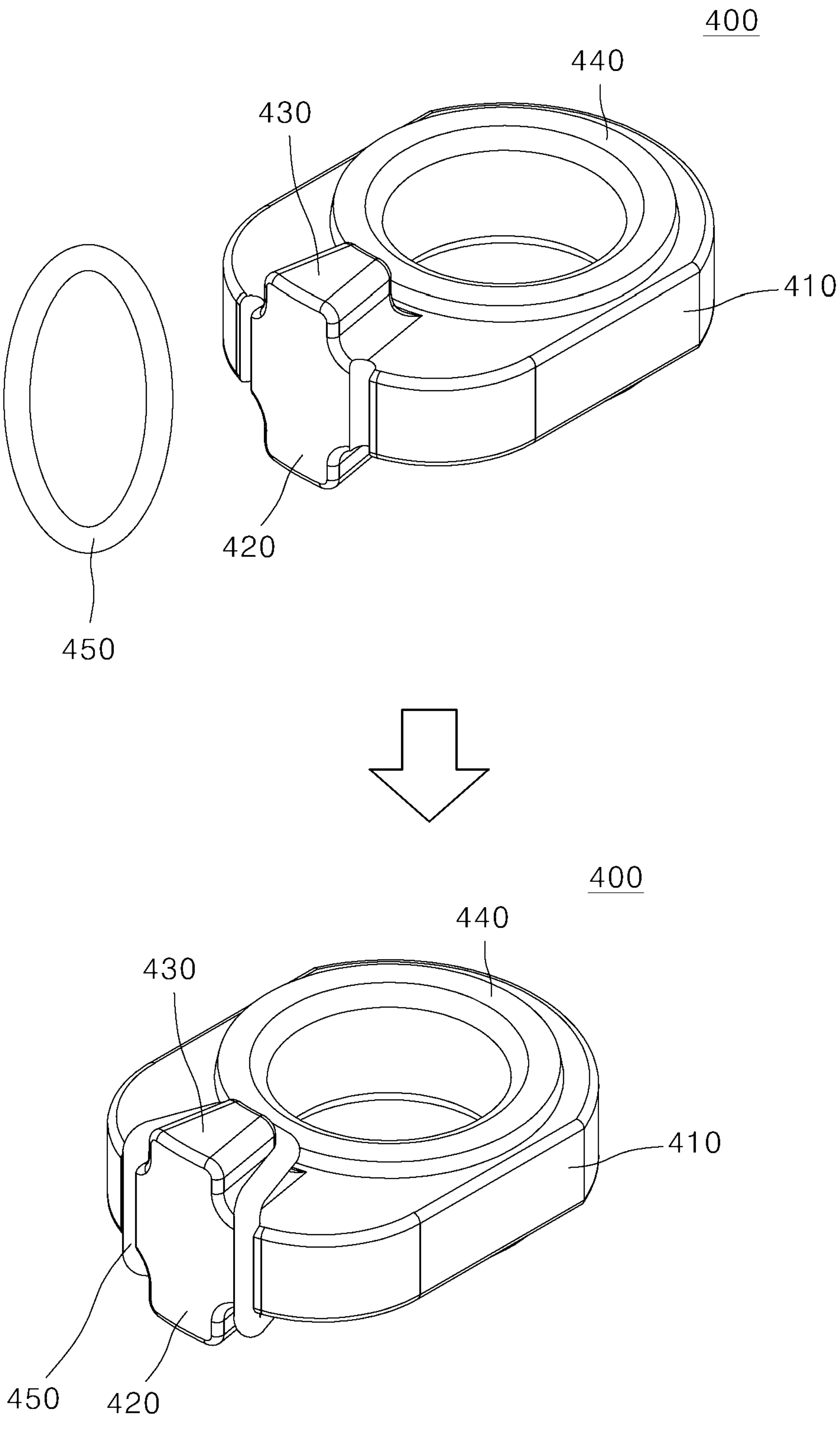
FIG. 7 is a perspective view schematically illustrating a second rotation part according to an embodiment of the present disclosure.
Figure 8:
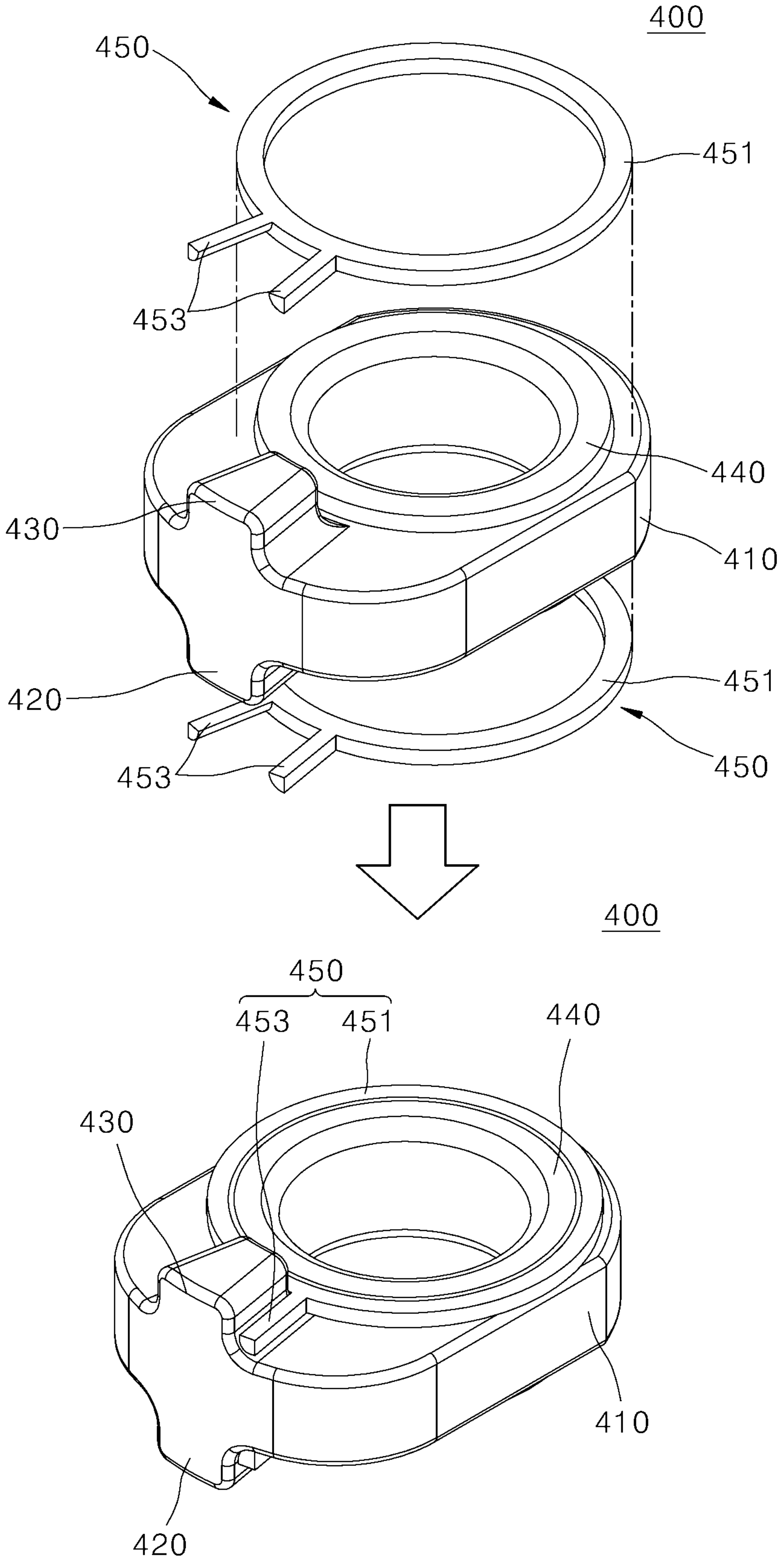
FIG. 8 is a perspective view schematically illustrating the second rotation part according to another embodiment of the present disclosure.
Figure 9:
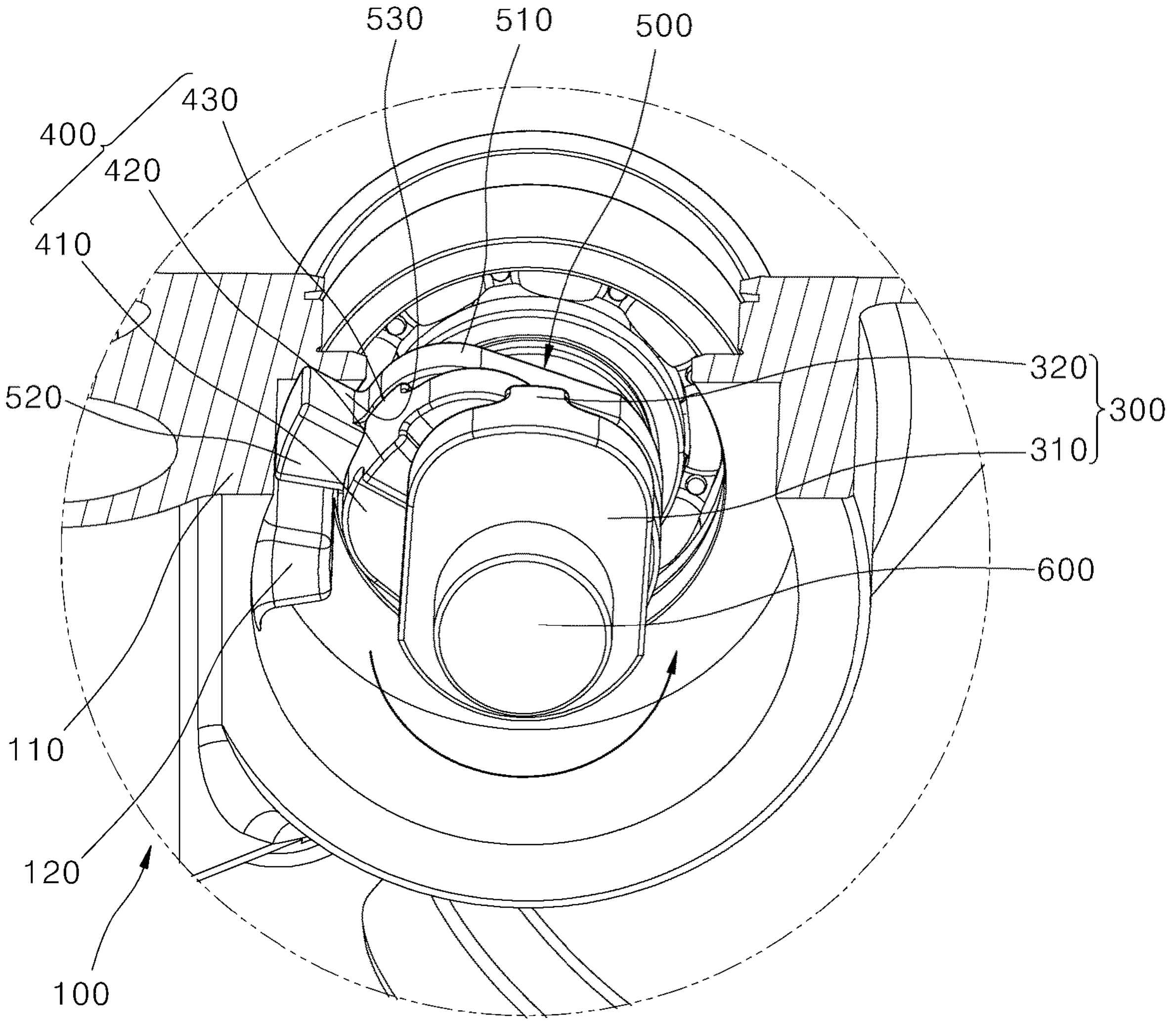
FIG. 9 is an operational perspective view schematically illustrating a rotation of the rotation shaft part in one direction in the steering apparatus for a vehicle according to an embodiment of the present disclosure.
Figure 10:
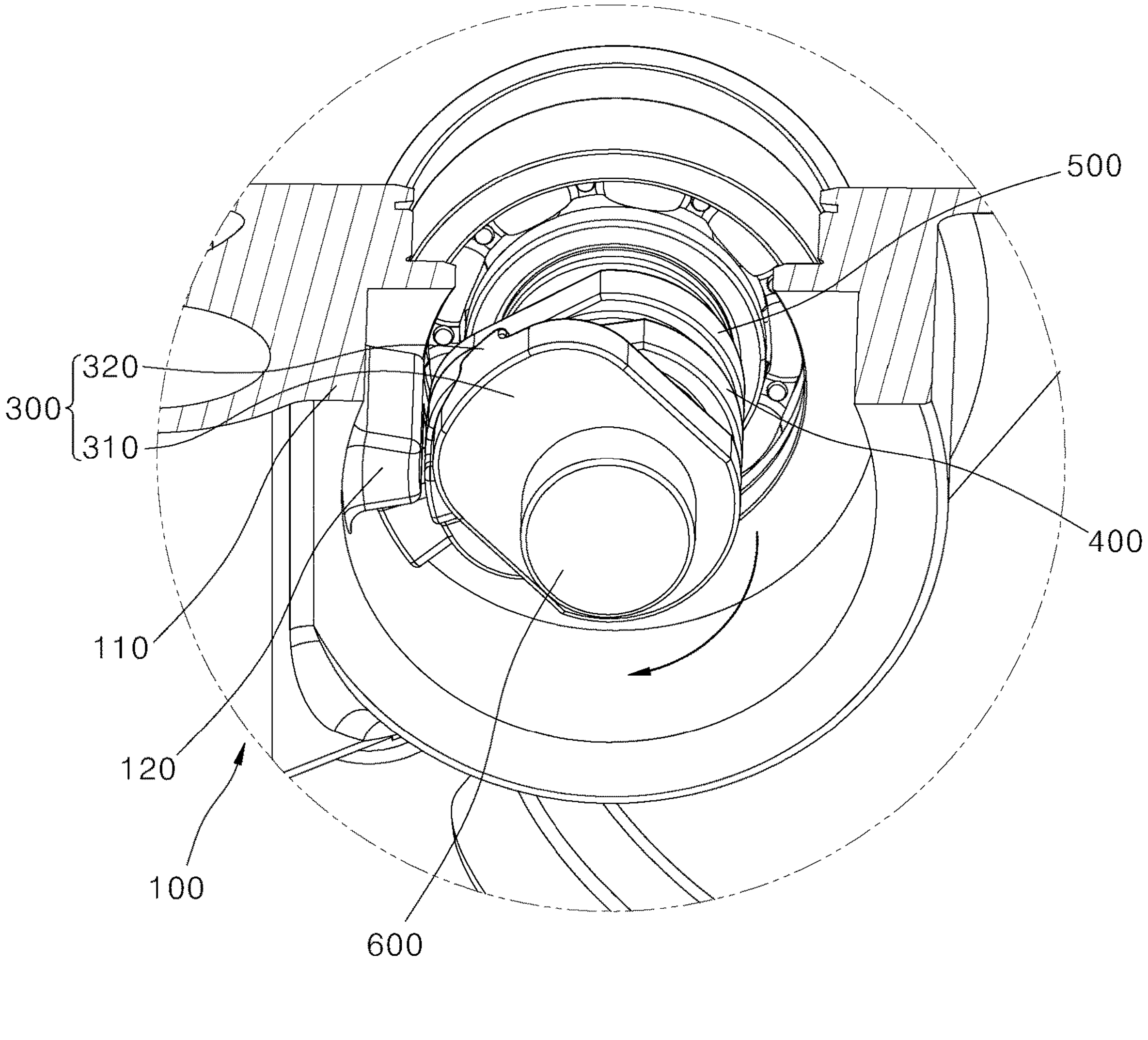
FIG. 10 is an operational perspective view schematically illustrating a rotation of the rotation shaft part in another direction in the steering apparatus for a vehicle according to an embodiment of the present disclosure.

FIG. 1 is a partial cutaway perspective view schematically illustrating a steering apparatus for a vehicle according to an embodiment of the present disclosure, FIG. 2 is a perspective view schematically illustrating the steering apparatus for a vehicle according to an embodiment of the present disclosure, FIG. 3 is a perspective view schematically illustrating a main structure of the steering apparatus for a vehicle according to an embodiment of the present disclosure, FIG. 4 is an assembled perspective view schematically illustrating a main structure of the steering apparatus for a vehicle according to an embodiment of the present disclosure. FIG. 5 is a partial cutaway view schematically illustrating the steering apparatus for a vehicle according to an embodiment of the present disclosure, FIG. 6 is a cross-sectional view taken along a line A-A of FIG. 5, FIG. 7 is a perspective view schematically illustrating a second rotation part according to an embodiment of the present disclosure, FIG. 8 is a perspective view schematically illustrating the second rotation part according to another embodiment of the present disclosure, FIG. 9 is an operational perspective view schematically illustrating a rotation of the rotation shaft part in one direction in the steering apparatus for a vehicle according to an embodiment of the present disclosure, and FIG. 10 is an operational perspective view schematically illustrating a rotation of the rotation shaft part in another direction in the steering apparatus for a vehicle according to an embodiment of the present disclosure.

Referring to FIGS. 1 to 10, a steering apparatus 1 for a vehicle according to an embodiment of the present disclosure may include a housing 100, a rotation shaft part 200, a first rotation part 300, a second rotation part 400, a third rotation part 500, and a bolt part 600.

The housing 100 may include a housing body part 110 and a housing protrusion part 120. The housing body part 110 may include the first rotation part 300, the second rotation part 400, the third rotation part 500, and the bolt part 600 in an internal space thereof.

A housing protrusion part 120 may be formed on an inner side surface of the housing body part 110 in a way to protrude therefrom. The housing protrusion part 120 may be disposed on a rotation path of the third rotation part 500 on the inner side surface of the housing body part 110.

The rotation shaft part 200 may be rotatably mounted on the housing body part 110 of the housing 100. The rotation shaft part 200 is connected to a shaft of a worm wheel 900 mounted in the steering apparatus 1 for a vehicle and may be rotated along with the shaft along the rotation of the shaft of the worm wheel 900.

The rotation shaft part 200 is engaged with the shaft of the worm wheel 900 and may be rotated along with the shaft along the rotation of the worm wheel 900.

The first rotation part 300, the second rotation part 400, and the third rotation part 500 may be mounted on an outer side surface of the rotation shaft part 200. Referring to FIG. 3, the first rotation part 300, the second rotation part 400, and the third rotation part 500 may be mounted on the outer side surface of the rotation shaft part 200 along a longitudinal direction of the rotation shaft part 200 from bottom to top.

An accommodating part 210 formed in an angular shape may be formed on the outer side surface of the end portion (the lower end portion with respect to FIG. 3) of the rotation shaft part 200. The first rotation part 300, which is formed in a planar shape and the like, on the outer side surface of the rotation shaft 200 and is mounted on the rotation shaft part 200 may be mounted on the accommodating part 210.

The first rotation part 300 may be pressed in and coupled with the accommodating part 210 of the rotation shaft part 200. The rotation shaft part 200 may be rotated along with the first rotation part 300.

The bolt part 600 may be mounted on an end portion (the lower end portion with respect to FIG. 3) of the rotation shaft part 200. The bolt part 600 mounted on the end portion of the rotation shaft part 200 may prevent the first rotation part 300 from being detached.

The first rotation part 300 may be mounted on the rotation shaft part 200 and may be rotated according to the rotation of the rotation shaft part 200. The first rotation part 300 is coupled to the accommodating part 210 of the rotation shaft part 200 and may be rotated along with the rotation shaft part 200.

The first rotation part 300 may include a first rotation body part 310 and a first rotation protrusion part 320. The first rotation body portion 310 may be provided with a first rotation hollow part 311 formed in a hollow shape and mounted on the rotation shaft part 200, and may be rotated along the rotation of the rotation shaft part 200.

The first rotation hollow part 311 is formed to be one-sided (to the right side with respect to FIG. 4) of the first rotation body part 310 and may be mounted on the accommodating part 210 of the rotation shaft part 200. The first rotation hollow part 311 may be formed in a shape corresponding to an angular shape of the accommodating part 210 of the rotation shaft part 200. The first rotation hollow part 311 is formed in the shape corresponding to an angular shape of the accommodating part 210 of the rotation shaft part 200 such that a slip phenomenon may be prevented. The first rotation hollow part 310 may be pressed in and coupled with the accommodating part 210 of the rotation shaft part 200.

The first rotation protrusion part 320 may be formed to protrude from the first rotation body part 310 toward the side of the second rotation part 400 and comes into contact with the second rotation part 400 while being rotated according to a rotation of the first rotation body part 310, so that the first rotation protrusion part 320 may rotate the second rotation part 400.

The first rotation protrusion part 320 may come into contact with the second rotating one-side protrusion part 420 of the second rotation part 400 during its rotation, thereby rotating the first rotation protrusion part 320.

The second rotation part 400 may be rotatably mounted on the rotation shaft part 200 and may be rotated in contact with the first rotation part 300. The second rotation part 400 may be rotated in contact with the first rotation part 300 and may come into contact with the third rotating portion 500. The second rotation part 400 may be disposed to be spaced apart from the first rotation part 300.

The second rotation part 400 may include a second rotation body portion 410, a second rotating one-side protrusion part 420, and a second rotating other-side protrusion part 430. The second rotating body portion 410 may be provided with a second rotation hollow part 411 formed in a hollow shape and rotatably mounted on the rotation shaft part 200.

The second rotation hollow part 411 is formed to be one-sided (to the right side with respect to FIG. 4) of the second rotation body part 410 and may be rotatably mounted on the rotation shaft part 200. A rotation portion 700 may be mounted on the inner side of the second rotation hollow part 411.

The second rotating one-side protrusion part 420 may protrude from the second rotation body part 410 toward the side of the first rotation part 300 (toward the lower side with respect to FIG. 4) and may come into contact with the first rotation part 300. The second rotating one-side protrusion part 420 may be rotated in a rotational direction of the first rotation part 320 in contact with the first rotation protrusion part 320 of the first rotation part 300. The second rotation part 400 may be rotated due to a rotation of the second rotating one-side protrusion part 420.

The second rotating other-side protrusion part 430 may protrude on the second rotation body part 410 toward the side of the third rotation portion 500 (toward the upper side with respect to FIG. 4) and may come into contact with the third rotation part 500. The second rotating other-side protrusion part 430 may be rotated in a rotational direction of the second rotating one-side protrusion part 420 that rotates in contact with the first rotation protrusion part 320 of the first rotation part 300. The second rotating other-side protrusion 430 while rotating, comes into contact with the third rotation protrusion part 520 of the third rotation part 500 to rotate the third rotating portion 530.

The second rotation part 400 may further include a second rotation opposite part 440. The second rotation opposite part 440 may be formed to protrude toward the sides of the first rotation part 300 and the third rotation part 500 from one surface (the lower side surface with respect to FIG. 4) and the other surface (the upper side surface with respect to FIG. 4) of the second rotation body part 410 in which the second rotation hollow part 411 is formed, respectively. The second rotation opposite parts 440 may be formed on one surface and the other surface of the second rotation body part 410 and on a portion in which the second rotation hollow portion 411 is formed, so that the first rotation body part 310 of the first rotation part 300 and the third rotation body part 510 of the third rotation part 500 may be formed to have a small contact surface.

The second rotation part 400 may further include an elastic part 450. The elastic part 450 may be mounted on the second rotating one-side protrusion part 420 and/or the second rotating other-side protrusion part 430, and may be elastically deformed when the elastic part 450 comes into contact with the first rotation part 300 and/or the third rotation part 500. The elastic part 450 may be mounted on the second rotating one-side protrusion part 420 and/or the second rotating other-side protrusion part 430 to reduce an NVH (Noise, Vibration, and Harshness) that are generated when the elastic part 450 comes into contact with the first rotation part 300 and the third rotation part 500.

The elastic part 450 may be made of an elastically deformable material that includes rubber, silicone, and the like.

Referring to FIG. 7, in one embodiment of the present disclosure, the elastic part 450 may be formed in an annular shape and wrap around the second rotating one-side protrusion part 420 and the second rotating other-side protrusion part 430. The elastic part 450 may be formed as a band type formed in an annular shape and may surround the second rotating one-side protrusion part 420 and the second rotating other-side protrusion part 430 up and down.

Referring to FIG. 8, in another embodiment of the present disclosure, an elastic part 450 may include a first elastic part 451 and a second elastic part 453. The first elastic part 451 may be formed in an annular shape and wrap around the second rotation opposite parts 440. The first elastic part 451 may be formed in an annular shape and wrap around the second rotation opposite parts 440 that is formed to protrude from each of one side (the lower side surface with respect to FIG. 8) and the other side (the upper side surface with respect to FIG. 8) of the second rotation body part 410. That is, the first elastic part 451 may comprise two pieces that wrap around the lower and upper sides of the second rotation opposite part 440. Alternatively, the first elastic part 451 may wrap around at least one of the lower and upper sides of the second rotation opposite part 440.

The second elastic part 453 may be extended from the first elastic part 451 and may be mounted to be in contact with the outer side surface of the second rotating one-side protrusion part 420 and/or the second rotating other-side protrusion part 430. The second elastic part 453 may be joined using a bonding method to the outer side surface of the second rotating one-side protrusion part 420 and/or the second rotating other-side protrusion part 430.

The third rotation part 500 may be rotatably mounted on the rotation shaft part 200 and rotated in contact with the second rotation part 400 and may be restricted in its rotation when it comes into contact with the housing protrusion part 120. The third rotation part 500 may be disposed to be spaced apart from the second rotation part 400.

The third rotation part 500 may include a third rotation body part 510, a third rotation protrusion part 520, and a third rotation stopper part 530. The third rotation body part 510 may be provided with a third rotation hollow part 511 formed in a hollow shape and mounted on the rotation shaft part 200.

The third rotation hollow part 511 maybe formed to be one side (to the right side with respect to FIG. 4) of the third rotation body part 410 and may be mounted on the rotation shaft part 200. A rotation part 700 may be mounted on the inner side of the third rotation hollow part 511.

The third rotation protrusion part 520 may protrude from the third rotation body part 510 toward the side of the second rotation part 400 and may come into contact with the second rotation part 300. The third rotation protrusion portion 520 may come into contact with the second rotating other-side protrusion part 430 of the second rotation part 400 and may be rotated along a rotational direction of the second rotation part 400.

The third rotation stopper part 530 may protrude from the outer side surface of the third rotation body part 510 and may be rotated according to the rotation of the third rotation body part 510, and may be restricted in its rotation when it comes into contact with the housing protrusion part 120. The third rotation stopper part 530 may be formed on the outer side surface of the third rotation body part 510 to be able to come contact with the housing protrusion part 120 along a circumferential direction of the third rotation body part 510. The third rotating stopper portion 530 may be formed extending from the third rotation protrusion portion 520.

The third rotation stopper part 530 may be restricted in its rotation when coming into contact with the housing protrusion part 120, thereby restricting the rotation shaft part 200 from being rotated more than 360 degrees.

The housing protrusion part 120 may be formed to protrude from the inner side surface of the housing body part 110 on the rotation path of the third rotation stopper part 530. The position of the housing protrusion part 120 may be adjusted along a circumferential direction of the housing body part 110 to restrict a rotational angle of the third rotation stopper part 530.

The first rotation part 300, the second rotation part 400, and the third rotation part 500 may all be made of a material that includes a steel material. The first rotation part 300, the second rotation part 400, and the third rotation part 500 are made of a material that includes a steel material, so that a structure thereof having a high rigidity and high strength may be maintained.

In the present disclosure, the rotation shaft part 200 is described as being configured into 3 parts such as the first rotation part 300, the second rotation part 400, and the third rotation part 500. However, the rotation shaft part 200 may be configured to include a plurality of second rotation parts 400 stacked between the first rotation part 300 and the third rotation part 500.

The bolt part 600 may be mounted on an end portion (the lower end portion with respect to FIG. 4) of the rotation shaft part 200 and may support the third rotation portion 500. The bolt part 600 may be coupled to the end portion of the rotation shaft part 200 in a longitudinal direction (the up-down direction with respect to FIG. 4) of the rotation shaft part 200. The bolt part 600 may be formed to have a screw thread on outer surface thereof and may be coupled to the rotation shaft part 200 by a screw coupling method. The head portion of the bolt part 600 may be formed to have greater diameter than the inner diameter of the first rotation hollow part 311 of the first rotation part 300 and supports the first rotation body part 310 of the first rotation part 300, so that the head portion of the bolt part 600 may prevent the first rotation part 300 from being detached.

The steering apparatus 1 for a vehicle according to the present disclosure may further include a tolerance part 800. The tolerance part 800 may be interposed between the rotation shaft part 200 and the first rotation hollow part 311 of the first rotation body part 310.

The tolerance part 800 may have a hollow cylindrical shape and may be formed by cutting one side thereof. The tolerance part 800 may be mounted on an end portion (the lower end portion with respect to FIG. 4) of the rotation shaft part 200 and may come into contact with an inner side surface of the first rotation hollow part 311 of the first rotation part 300. The tolerance part 800 may be made of a material that includes a metallic material.

The tolerance part 800 may prevent the first rotation part 300 from being damaged in case that a force greater than a set value is applied to the rotating rotation shaft part 200 and is transmitted to the first rotation body part 310 of the first rotation part 300.

The steering apparatus 1 for a vehicle according to the present disclosure may further include the rotation part 700. The rotation part 700 may be disposed between the rotation shaft part 200 and the second rotation part 400, and between the rotation shaft part 200 and the third rotation part 500. The rotation part 700 may allow the second rotation part 400 and the third rotation part 500 to separately rotate with respect to the rotation shaft part 200.

The rotation part 700 may separate the rotation shaft part 200 from the second rotation part 400, and the rotation shaft part 200 from the third rotation part 500 from each other. The second rotation 400 and the third rotation 500 may rotate separately with respect to the rotation shaft part 200 by the rotation part 700.

That is, the rotation part 700 is disposed between the rotation shaft part 200 and the second rotation hollow part 411 of the second body part 410, and between the rotation shaft part 200 and the third rotation hollow part 511 of the third rotation body part 510, so that the rotation part 700 may restrict a rotation of the rotation shaft part 200 from being transmitted to the second rotation part 400 or the third rotation part 500. The rotation part 700 may prevent the second rotation part 400 and the third rotation part 500 from being rotated along the rotation of the rotation shaft part 200.

The rotation part 700 may include a rotation body part 710 and the rotation flange part 720. The rotation body part 710 may be formed in a hollow cylindrical shape and may be disposed between the rotation shaft part 200 and the second rotation part 400, and between the rotation shaft part 200 and the third rotation part 500, respectively. The rotation body part 710 may be disposed between the rotation shaft part 200 and the second rotation hollow part of the second rotation body part 410, and between the rotation shaft part 200 and the third rotation hollow part 511 of the third rotation body part 510, respectively.

The rotation flange part 720 may be made of a flat plate formed to have greater diameter than the outer diameter of the rotation body part 710 at an end of the rotation body portion 710 (the lower end portion with respect to FIG. 4), and may come into contact with the first rotation body portion 310 of the first rotation part 300, or may come into contact with the second rotation body part 410 of the second rotation part 400 or the second rotation opposite part 440 of the second rotation part 400.

An operation of the steering apparatus for a vehicle according to the present disclosure may be described with reference to FIGS. 9 to 10.

Referring to FIG. 9, it is illustrated that the rotation shaft part 200 is rotated in one direction (the counterclockwise direction with respect to FIG. 9) in the steering apparatus 1 for a vehicle according to an embodiment of the present disclosure.

When the rotation shaft part 200 is rotated in one direction (the counterclockwise direction with respect to FIG. 9) within the housing 100, the first rotation part 300 may also be rotated along the rotational direction of the rotation shaft part 200.

The first rotation protrusion part 320 of the first rotation part 300 may come into contact with the second rotating one-side protrusion part 420 of the second rotation part 400 according to the rotation of the first rotation part 300. The second rotation part 400 may also be rotated along the rotational direction of the first rotation part 300 by the second rotating one-side protrusion part 420 that comes into contact with the first rotation protrusion part 320.

The second rotating other-side protrusion part 430 of the second rotation part 400 may come into contact with the third rotation protrusion part 520 of the third rotation part 500 according to the rotation of the second rotation part 400. The third rotation part 500 may also be rotated along the rotational direction of the second rotation part 400 by the third rotation protrusion part 520 that comes into contact with the second rotating other-side protrusion part 430.

The third rotation stopper part 530 of the third rotation part 500, which rotates according to the rotation of the third rotation part 500 may be restricted in its rotation by coming into contact with the housing protrusion part 120 of the housing 100. The third rotation stopper part 530 may be rotated in the counterclockwise direction less than 360 degrees by contacting with the housing protrusion part 120. Therefore, a rotational angle (a steering angle) of the rotation shaft part 200 in the counterclockwise direction may be restricted.

Referring to FIG. 10, it is illustrated that the rotation shaft part 200 is rotated in the other direction (the clockwise direction with respect to FIG. 10) in the steering apparatus 1 for a vehicle according to an embodiment of the present disclosure.

When the rotation shaft part 200 is rotated in the other direction (the clockwise direction with respect to FIG. 10) within the housing 100, the first rotation part 300 may also be rotated along the rotational direction of the rotation shaft part 200.

The first rotation protrusion part 320 of the first rotation part 300 may come into contact with the second rotating one-side protrusion part 420 of the second rotation part 500 according to the rotation of the first rotation part 300. The second rotation part 400 may also be rotated along the rotational direction of the first rotation part 300 by the second rotating one-side protrusion part 420 that comes into contact with the first rotation protrusion part 320.

The second rotating other-side protrusion part 430 of the second rotation part 400 may come into contact with the third rotation protrusion part 520 of the third rotation part 500 according to the rotation of the second rotation part 400. The third rotation part 500 may also be rotated along the rotational direction of the second rotation part 400 by the third rotation protrusion part 520 that comes into contact with the second rotating other-side protrusion part 430.

The third rotation stopper part 530 of the third rotation part 500 that rotates along the rotation of the third rotation part 500 may be restricted from its rotation by contacting with the housing protrusion part 120 of the housing 100. The third rotation stopper part 530 may be rotated in the clockwise direction less than 360 degrees by contacting with the housing protrusion part 120. Therefore, a rotation angle (a steering angle) of the rotation shaft part 200 in the clockwise direction may be restricted.

According to the steering apparatus 1 for a vehicle in accordance with the present disclosure, the steering apparatus 1 for a vehicle has a structure in which the first rotation part 300, the second rotation part 400, and the third rotation part 500 are configured to transmit rotational force while rotating in a rotational direction of the rotation part 200, so that there may be no clearance therebetween and the occurrence of friction distribution may be minimized.

In addition, according to the present disclosure, the elastic part 450 may be mounted on the second rotation part 400, and the second rotation part 400 may be disposed between the first rotation part 300 and the third rotation part 500 such that an NVH (Noise, Vibration, and Harshness) of the vehicle may be reduced by alleviating shock upon contact.

In addition, according to the present disclosure, it may be possible to provide the steering apparatus 1 for a vehicle that may be designed to have an optimal size.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A steering apparatus for a vehicle, comprising:

a housing having a housing body part, and a housing protrusion part that protrudes from an inner side surface of the housing body part;

a rotation shaft part rotatably mounted on the housing;

a first rotation part mounted on the rotation shaft part and rotated according to a rotation of the rotation shaft part;

a second rotation part rotatably mounted on the rotation shaft part and rotated upon contact with the first rotation part;

a third rotation part rotatably mounted on the rotation shaft part, rotated upon contact with the second rotation part, and restricted in its rotation when coming into contact with the housing protrusion part; and a bolt part mounted on an end portion of the rotation shaft part and configured to support the third rotation part.

2. The steering apparatus of claim 1, wherein the first rotation part comprises:

a first rotation body part having a first rotation hollow part that has a hollow shape, the first rotation body part is mounted on the rotation shaft part and rotated according to the rotation of the rotation shaft part; and a first rotation protrusion part that protrudes from the first rotation body part toward a side of the second rotation part, and rotates the second rotation part upon contact with the second rotation part while being rotated according to the rotation of the first rotation body part.

3. The steering apparatus of claim 1, wherein the second rotation part comprises:

a second rotation body part having a second rotation hollow part that has a hollow shape and rotatably mounted on the rotation shaft part;

a second rotating first-side protrusion part that protrudes from the second rotation body part toward a side of the first rotation part, and comes into contact with the first rotation part;

a second rotating second-side protrusion part that protrudes from the second rotation body part toward a side of the third rotation part, and comes into contact with the third rotation part.

4. The steering apparatus of claim 3, wherein the second rotation part further comprises:

a second rotation opposite part that protrudes from each of a first surface and a second surface of the second rotation body part, in which the second rotation hollow part is present, towards the side of the first rotation part and the side of the third rotation part, respectively.

5. The steering apparatus of claim 4, wherein the second rotation part further comprises:

at least one elastic part that is mounted on the second rotating first-side protrusion part or the second rotating second-side protrusion part, and configured to be elastically deformable when coming into contact with the first rotation part or the third rotation part.

6. The steering apparatus of claim 5, wherein the at least one elastic part has a shape of an annular shape and configured to wrap around the second rotating first-side protrusion part and the second rotating second-side protrusion part.

7. The steering apparatus of claim 5, wherein the at least one elastic part comprises:

a first elastic part configured to wrap around the second rotation opposite part; and a second elastic part that is extended from the first elastic part and mounted to be in contact with an outer side surface of the second rotating first-side protrusion part or the second rotating second-side protrusion part.

8. The steering apparatus of claim 1, wherein the third rotation part comprises:

a third rotation body part having a third rotation hollow part that has a hollow shape and mounted on the rotation shaft part;

a third rotation protrusion part that protrudes from the third rotation body part toward the second rotation part, and comes into contact with the second rotation part;

a third rotation stopper part that protrudes from an outer side surface of the third rotation body part, rotates according to the rotation of the third rotation body part, and be restricted from its rotation when coming into contact with the housing protrusion part.

9. The steering apparatus of claim 1, further comprising:

a fourth rotation part disposed (i) between the rotation shaft part and the second rotation part, and (ii) between the rotation shaft part and the third rotation part to allow the second rotation part and the third rotation part to rotate separately with respect to the rotation shaft part.

10. The steering apparatus of claim 1, further comprising a tolerance part disposed between the rotation shaft part and the first rotation part.

* * * * *